United States Patent [19]
Kinghorn et al.

[11] Patent Number: 6,020,882
[45] Date of Patent: Feb. 1, 2000

[54] TELEVISION ACCESS CONTROL SYSTEM

[75] Inventors: John R. Kinghorn, Brockenhurst; David R. Tarrant, Romsey, both of United Kingdom

[73] Assignee: U.S. Philips Corporation, New York, N.Y.

[21] Appl. No.: 09/021,260

[22] Filed: Feb. 10, 1998

[30] Foreign Application Priority Data

May 15, 1997 [GB] United Kingdom ............. 9703193

[51] Int. Cl.⁷ .................................................. H04N 7/10
[52] U.S. Cl. ................................... 345/327; 348/5.5
[58] Field of Search .............................. 348/5.5, 6, 7, 10, 348/12, 552, 553, 563, 725, 734; 455/6.2, 6.3; 345/327; H04N 5/445

[56] References Cited

U.S. PATENT DOCUMENTS

| | | | |
|---|---|---|---|
| 4,930,160 | 5/1990 | Vogel | 380/23 |
| 5,382,983 | 1/1995 | Kwoh et al. | 348/716 |
| 5,550,575 | 8/1996 | West et al. | 348/5.5 |
| 5,828,402 | 10/1998 | Collings | 348/5.5 |

FOREIGN PATENT DOCUMENTS

| | | | |
|---|---|---|---|
| 2267768A | 12/1993 | United Kingdom | H04N 7/16 |
| 8302208 | 6/1983 | WIPO | H04N 7/04 |
| WO8302208 | 6/1983 | WIPO . | |
| 9641438 | 12/1996 | WIPO | H04K 1/00 |

*Primary Examiner*—Nathan Flynn
*Attorney, Agent, or Firm*—Edward W. Goodman

[57] ABSTRACT

An arrangement for the control of viewing of a television program in which a classification code is transmitted with the video signal, for example, in an extension packet of a teletext signal, includes a decoder (23) which detects the received codes and passes them to a microcontroller (27). An authorized user is able to enter codes of permitted program classifications by means of a remote control unit (28). Codes representing these permitted classifications are stored in a non-volatile memory (29). The received and permitted codes are compared in the microcontroller (27) which inhibits the video (25) and/or audio (32) circuits if the received codes are not permitted codes. The non-volatile memory (29) is arranged to store a plurality of different program classifications, each of which is valid for different periods of the day.

13 Claims, 10 Drawing Sheets

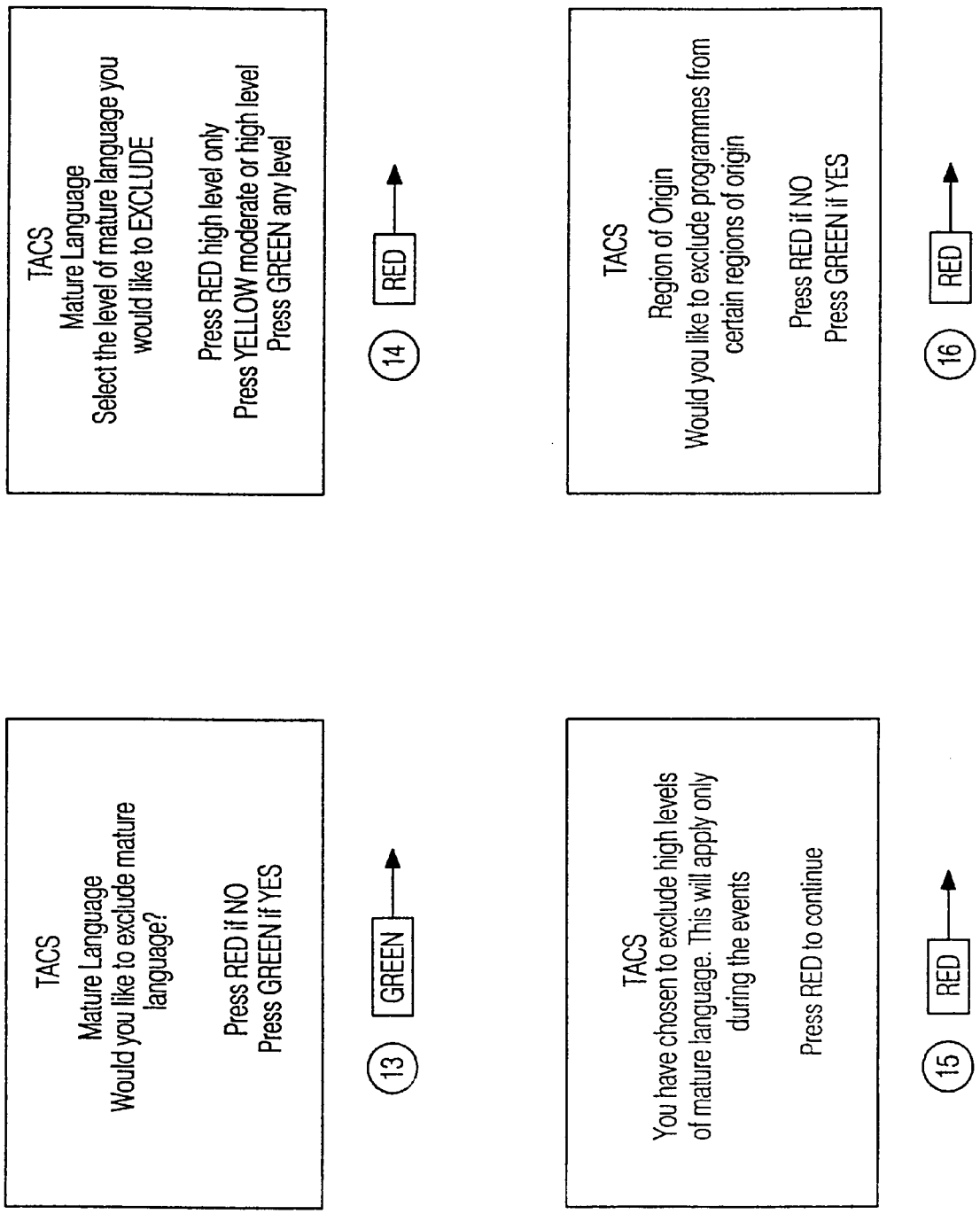

TACS

You can select these categories at different times of day.

Press RED to choose all day
Press Green to select times

①  ⟶

TACS

Enter start and stop times for these categories as 4 digit numbers (e.g. 2100)

Start time ........................................................

Stop time ........................................................

②

TELEVISION ACCESS CONTROL SYSTEM

BACKGROUND OF THE INVENTION

Field of The Invention

The invention relates to a method of and apparatus for enabling the inhibition of television program display in dependence on the program content.

A law has been passed in the U.S.A. which requires that all television receivers having a display above a certain size sold from 1998, will have to have a means of enabling parents to prevent children from viewing coded programs containing violence, sex, and bad language. A so called "V-chip" is proposed which will monitor a code transmitted with the television signal and disable the television receiver when the code indicates forbidden program material, including scenes of violence, sex or other matter, which might be considered objectionable by some audiences or unsuitable for children.

In the U.S. V-chip system, the broadcaster rates each program in four censorship categories. The values for each category are then transmitted simultaneously as part of the extended data services (EDS) of the Closed Captioning (CC) system. The values are transmitted for as long as the program is on the air.

Using an access control mechanism, the parent sets a threshold for each category. If a rating exceeds the pre-authorized value, the V-chip suppresses the video and audio signals. As the reaction of the V-chip decoder is near instantaneous, the system can easily handle channel hopping. Moreover, the parent does not have to worry about missing content warnings in TV guides or at the start of programs.

The Electronic Industries Association (EIA) defines the four censorship categories and the number of data bits required to transmit the code:

MPAA rating (equivalent to film classifications, e.g., 18, PG, etc.)—3 bits
violence content advisory level—2 bits (which allows for a scale of 0 to 3)
sexual content advisory level—2 bits
mature content advisory level—2 bits.

The same principles apply to a system being field-tested in Canada but, at present, the two are not identical.

All American TV sets built after July 1993 had to include a CC decoder to provide subtitling. Current CC decoders (such as, the SAA5252 decoder sold by Philips Semiconductors) are capable of blanking out the TV picture when switched into full-text mode. They also have adequate display features to generate an OSD menu so that parents can program the censorship thresholds.

Unlike teletext, CC data can be recorded and reproduced by a VHS VCR during play-back of a program. Thus recorded and prerecorded tapes could also contain censorship data.

In Europe, the question of implementing a V-chip type system is altogether more complex than North America. The broadcasters are not regulated by a single government, and cultural and language differences mean variance in acceptable moral standards. Then, there are the technical issues of coping with a 625-line TV system that has little spare capacity for extra data signals.

The obvious solution is to use the American system but this has some disadvantages.

First, for broadcasters, the CC signal would occupy valuable teletext transmission capacity (one line would be permanently lost) and different encoding systems would be required.

Secondly, it would be very expensive for broadcasters in terms of the duplicate transmission equipment and data bridges (in cable amplifiers) required for both teletext and CC signals.

Thirdly, consumer electronics manufacturers would have additional overheads in providing teletext and CC decoding in every TV set and PC TV card.

Description of the Related Art

The concept of enabling a parent to control viewing of a television receiver using information transmitted by the broadcaster is not new and was proposed in International Patent Application WO83/02208 published on Jun. 23, 1983, corresponding to U.S. Pat. No. 4,605,964. In that document, it is proposed that a code be sent via the teletext signal transmitted with the television signal, the code being formed as a selected row number of a given teletext page. Thus, the page number and row number is transmitted in the field blanking period on the occurrence of a possibly offensive event. At the receiver, a teletext decoder is permanently set to look for the relevant page and identify the row number as and when transmitted. The particular row numbers indicated particular gradings of sound and vision events.

Various other means to convey the code have been proposed which involve the use of PDC signals and widescreen signalling signals as disclosed in our co-pending UK Patent Application No. 9703192.6, corresponding to U.S. patent application Ser. No. 09/021,335, filed Feb. 10, 1998 (PHB34135).

All these arrangements require a parent, or other responsible person, to enter the appropriate codes into the television receiver and/or video recorder. Where a set is being used only by a child whose access to particular types of program is to be restricted, these codes can be entered and then no further action on the part of the parent is necessary. Where, however, different members of the family may be viewing the television set at different times of the day, the program classification appropriate for one member of the family may not be appropriate for other members of the family. This means that frequent entry of different classification codes may be required, and this imposes a considerable burden on the responsible person. For example, it may be necessary to reset the classification code to the lowest level every time the television set is switched off to ensure that material unsuitable for a child does not become inadvertently available. A consequence of this is that such a system may not be properly used unless the parent is extremely conscientious.

SUMMARY OF THE INVENTION

It is an object of the invention to enable an editorial function to be exercised over the output of a television receiver by a parent or other person in authority over that receiver and to ease the task of ensuring the classification level is suitable for the audience likely to be viewing.

The invention provides a method of disabling the sound and/or visual display of a television program, the method comprising the steps of i) establishing the authority of the user to define the program or parts thereof which are to be disabled, ii) entering into a memory within the television receiver, code words correspond to a program classification it is desired to suppress, iii) entering into the memory the time(s) during which the code words entered in step ii) are to apply, iv) entering into the memory, further code words corresponding to program classification it is desired to suppress, v) entering into the memory, further time(s) during which the further code words are to apply, vi) receiving television signals including code words representing the program classification, vii) comparing the received code words with the entered code words which apply at the time of reception, and viii) disabling the sound and/or visual display in dependence on the result of the comparison.

By enabling the entry and storage of a plurality of sets of classification codes together with the times for which each of the sets of codes is valid, it is not necessary to repeatedly enter sets of codes to take into account the persons who are likely to be viewing the television set at different times of the day. Thus, for example, during the morning and afternoon when small children are likely to be watching, a very low classification level may be entered, while in late evening, when only the parents are likely to be watching, or at least their presence in a position to take action is likely, a higher classification level may be entered to take into account the taste and interests of the parents. These changes can take place automatically at a pre-selected time without any action by the user being required once the initial entry of the classification codes into the memory has been made. As a result, this simplifies the task of the authorized person and, consequently, such a person is more likely to control the viewing habits of potentially vulnerable viewers.

The method may include the steps of ix) monitoring the teletext real-time clock to determine the time x) using the time determined in step ix) to select the code words stored for comparison with the received codes.

In many countries, a teletext signal is transmitted with the television signal and this teletext signal includes a real-time clock. Thus a teletext decoder within a television receiver can make available a time signal which can be used to select the particular one of the sets of classification codes which it is desired to apply at that time.

The method may further include the steps of xiv) monitoring the source of the received television signal, and xv) if the source is time shifted from the original transmission of the television signal so that the teletext real-time clock is not valid, either setting the comparison code words to those having the lowest level classification, or disabling the sound or visual display.

One problem with using the teletext real-time clock is that it may be defeated when using video recorders. Thus a program recorded at 22.00 may be replayed at 14.00 but the receiver will be deceived into believing that the time is 22.00 and will apply the classification code appropriate to that time. By monitoring the signal source, it can be determined that it is a possibly time-shifted source and that the teletext clock is not giving a valid time. Various actions can then be taken, such as, always allocating the lowest classification level to a time-shifted program or not allowing time-shifted programs unless the highest classification levels are authorized. Further, an additional clock could be substituted, the additional clock giving the correct rather than a time-shifted time.

As an alternative, or in addition, the method may include the steps of xi) generating a real-time clock within the television receiver, xii) monitoring the real-time clock to determine the time, and xiii) using the time determined in step xii) to select the code words stored for comparison with the received codes.

With this method, it is, of course, necessary to ensure that the clock retains a sufficient accuracy and cannot be altered, for example, by switching the receiver off. That is, power needs to be applied to the clock at all times. One simple measure to achieve this is the use of battery power for the clock circuit.

The invention further provides a television receiver including means for enabling an authorized person to disable the sound and/or visual display of a received program according to a classification code received with the television program, the television receiver comprising means for establishing the authorization of the authorized person, non-volatile memory means for storing a plurality of sets classification codes entered by the authorized person each set of codes being valid at times entered by the authorized person, means for receiving and detecting classification codes multiplexed with the received television signal, means for monitoring the time, means for comparing a selected one of the sets of classification codes with the received classification code, the selected set being dependent on the monitored time, and means for disabling the sound and/or visual display in dependence on the result of the comparison.

Thus, responsible persons, such as parents, can prevent their children watching undesirable material when they are not present, for example, during the day when they are undertaking tasks around the house and may not be able to closely monitor what their children are watching. During the evening, particularly late evening, it may not be appropriate to have the same classification level as the parents' interests may involve programs having a higher classification level. If the classification codes have to be changed manually each time there is a danger that the parents will forget to do so before turning the television receiver off at night and, consequently, an undesirable level may become available to the children. Conversely, they may forget to change the level before starting viewing in the evening and find a program being unexpectedly and annoyingly interrupted. This may cause the system to fall into disrepute and cause the parents to leave it at the highest classification level. By enabling an automatic change of classification dependent on the time of day, the task of the parents is much reduced and, consequently, the likelihood of the system being properly used is increased.

The means for monitoring the time may comprise means for decoding a teletext signal multiplexed with the received television signal, and means for monitoring the real-time clock signal forming part of the teletext signal.

In many countries, a teletext signal is transmitted with the television signal and this teletext signal includes a real-time clock. Thus, a teletext decoder within the television receiver can make available a time signal which can be used to select the particular one of the sets of classification codes which it is desired to apply at that time. This will minimize the additional circuitry required to perform this function and provide an accurate time signal.

Alternatively, or in addition, the means for monitoring the time may comprise means for generating a real-time clock, and means for using the output of the real-time clock to select the appropriate one of the sets of classification codes.

Where no teletext signal is available, an internally-generated clock may be used to determine the time of day. The operation of the clock will, of course, need to be independent of whether the television receiver is switched on, and a battery supply may be used. Such a battery supply may also provide power for the non-volatile memory.

The television receiver may include means for monitoring the source of the received television signal, and means for establishing whether the teletext real-time clock signal is a valid representation of the actual time.

The television receiver may include means for modifying the time indicated by the teletext real-time clock if it is established that the received television signal originates from a source located in a different time zone from that in which the receiver is located.

The television receiver may include means for inhibiting the selection of a set of classification codes by the teletext real-time clock if it is established that the received television signal is being replayed by a recording device.

There are various reasons why the teletext real-time clock may not be an accurate representation of the true time as far as the viewer is concerned. These include the possibility that the received program is being transmitted from a different time zone from that in which the receiver is located, the teletext clock will normally relate to the time at the program source. Thus, if the time difference can be established, a correction to the time might be made. A further possibility is that a program has been recorded, for example, on a VCR, and the time at which it is replayed will bear no relationship to the time at which it was transmitted. Consequently the teletext real-time clock will not have validity. One solution is to apply the lowest classification to the display of material originating from a recorder. Another possibility is to prevent display of any programs from a recorded source at given times.

The above and other features and advantages of the invention will be illustrated by and be apparent from the following description, by way of example, of an embodiment of the invention with reference to the accompanying drawings.

BRIEF DESCRIPTION OF THE DRAWINGS

FIGS. 5A–5E illustrate a process for programming the television receiver to operate according to the method of the invention;

DESCRIPTION OF THE PREFERRED EMBODIMENTS

While the following description is of a method and apparatus in which the program classification codes are transmitted and received by means of teletext extension packets, the present invention is independent of the method of transportation of these codes and of the actual classification codes to be used. Thus the codes may be transmitted in, inter alia, any of the ways mentioned herein. The following embodiment is merely one way of implementing the invention.

Figure 1:
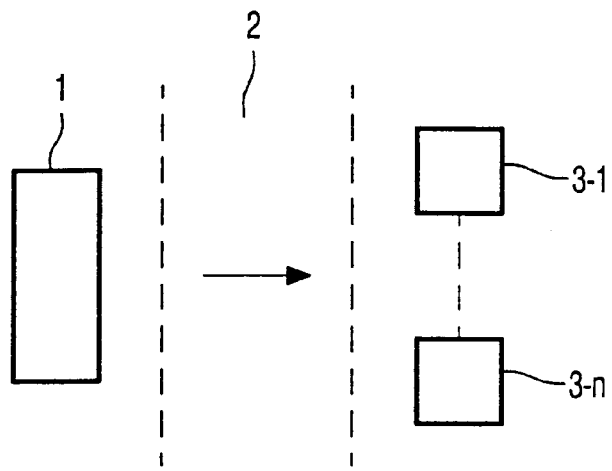
FIG. 1 shows a television system for carrying out a method for enabling the inhibition of television program display in dependence on the program content.

FIG. 1 is a block schematic diagram of a system in which the methods according to the invention may be carried out.

The system shown in FIG. 1 comprises a television signal source 1, a television transmission medium 2, and a plurality of television receivers 3-1 to 3-n. The television signal program source may be a normal television broadcast equipment, either terrestrial broadcast or satellite broadcast, or could be the program source for a cable television network. The television program source includes a teletext inserter and means for entering program classification codes into an extension packet of the teletext signal. The transmission medium 2 may take any convenient form, for example, it could be radio waves as broadcast by a terrestrial transmitter or a satellite transmitter, or it could be a cable network for a cable TV system. The television receivers 3-1 to 3-n are connected to the program source via the transmission medium 2. A further possible program source 1 is a video tape or disc on which a program is recorded for replay by a video tape recorder or a video disc player, in which case, the transmission link 2 may be simply the tape recorder or disc player and a cable connecting the tape recorder or disc player to the television receiver.

Figure 2:
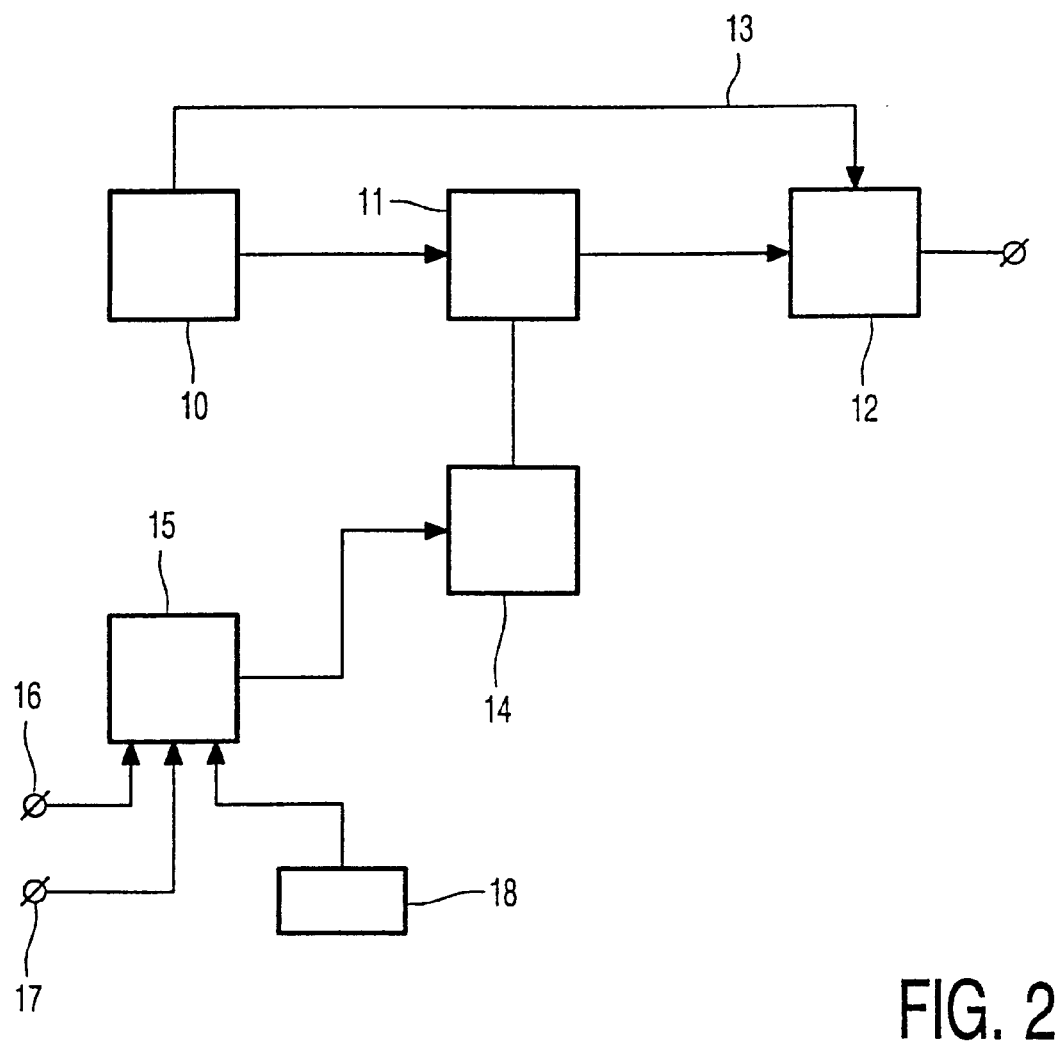
FIG. 2 shows in block schematic form a television program source for use in the system of FIG. 1.

An embodiment of a television signal program source suitable for use in this system is shown in block schematic form in FIG. 2. The television program source comprises a source of video and audio signals 10 which may, for example, be a television camera whose video output is fed, via a teletext inserter 11, to a transmission network 12. The audio output from the television signal source 10 is fed via a line 13 to a further input of the transmission network 12. A conventional teletext editing system 14 is connected to the teletext inserter 11 and has a further input which is fed from a TV access control equipment 15.

The TV access control equipment 15 is arranged to insert into an extension packet of the teletext signal, code words classifying the content of the television program being created by the signal source 10. The TV access control equipment 15 has a first input 16 which receives data from a TV program scheduling system. This data will, for example, provide an overall indication of the content of the program which can be used to inhibit display of that program at a receiver. The information may, for example, define the levels of violence, sexual content, mature language or distressing content which may occur in the program.

The TV access control equipment 15 has a second input 17 which receives data from pre-recorded material. Pre-recorded material may already include the coding to indicate the type of content present in the program and may also include instantaneous data to classify particular events during a program. A keyboard or other input device 18 is connected to a further input of the TV access control equipment 15. This is to enable an operator to insert appropriate classification codes into a live program. It is, of course, necessary to delay the actual transmission of the program by a short period so that there is time for the operator to enter the appropriate codes at the appropriate times. Such transmission delays are well known for live programs to enable the broadcasting authority to cut out any undesirable occurrences. For example, in live phone in programs, to cut out any libelous or obscene comments made by a person phoning in.

The codes generated by the TV access control equipment 15 or received by it and passed to the teletext editing system, are then inserted into an extension packet of the teletext signal. In particular, they may be inserted into selected bytes of the packet 8/30 format 1.

Figure 3:
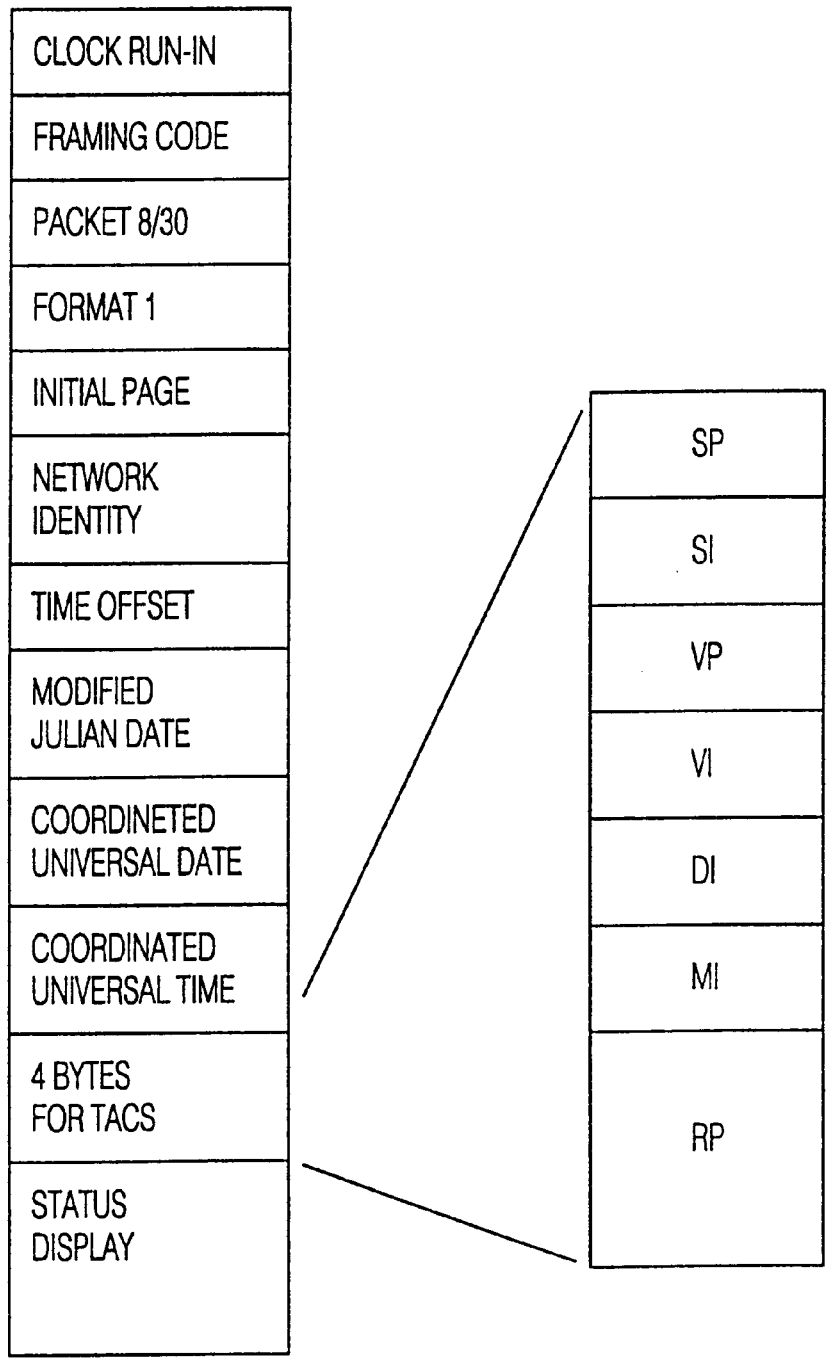
FIG. 3 shows a scheme for code words for classifying programs, the code words being inserted into a teletext extension packet.

FIG. 3 shows the content of packet 8/30 format 1 modified to enable the invention to be carried out. Thus, it comprises a clock run-in period and framing code and bytes containing information identifying it as packet 8/30, as format 1, defining an initial page, a network identity, a time offset, modified julian date and coordinated universal time. There are then four bytes available which are, according to the invention, used to transmit classification codes for the program. There are then further bytes defining status display.

Four bytes give essentially 32 bits which may be used for encoding data. It is desirable that the classification codes are sent reliably since it would be extremely annoying to a viewer if the program was interrupted because of faulty reception of the classification codes. This error protection will, of course, reduce the number of data bits available for encoding the classification codes. In an embodiment according to the invention, these four bytes are used to transmit 16 message bits which are 4/8 Hamming coded for error protection. A proposal for allocating these message bits is as follows:

- 2 bits for sexual content of the whole program
- 2 bits for sexual content of individual events within a program
- 2 bits for violence content within a program
- 2 bits for violent content of incidents within a program
- 2 bits for distressing incidents within a program
- 2 bits for mature language within a program, and
- 4 bits for an indication of the region of origin of the program.

The allocation of two bits for each of the program content classifications allows four possible levels to be set for that particular content. For example, the code 00 could mean no content of that type, the code 01 a low level content, the code 10 a medium level content, and the code 11 a high content level. It is considered useful to have a coding as far as sexual and violent content is concerned for the whole program and for individual incidents within a program. Thus, for example, a parent could decide that programs having a low or medium sexual content level could be viewed by children so long as the individual events containing sexual content were inhibited. Thus they would set the acceptable program level to 01, while they may wish to eliminate incidents having sexual content altogether and thus set the event within the program code to 00. The same considerations apply to violent content within a program. The distressing content classification is likely to be only of limited duration within a program. The types of content which are being considered here are, for example, details where, in medical programs, operations are being shown. In this case, viewers may well be interested in the medical techniques but find the portrayal of operations distressing. Other instances where distressing content may occur is in news or current affairs programs. For example, interviews with recently bereaved persons may be distressing to some people, or pictures showing the effects of famine or other disasters. The mature language content of a program will normally also be fairly intermittent and, hence, it is considered that the proscribing of a whole program on that basis is perhaps not appropriate and that the instances which the mature language occurs can be suppressed.

The region of program origin code is considered useful in that different areas and countries have different moral codes and, consequently, what may be classified as a low level of violence in one region may be classified as a medium or even high level of violence in another region. The same considerations may well apply to sexual content and also distressing or mature language content. It would be possible within the receiver to modify the codes for sexual, violent, distressing and mature language content in accordance with the code for the region of origin of the program. Thus, in region 1, medium level sexual content may correspond to high level sexual content in region 2.

It is also possible to bar programs originating from a given region, for example, for political or religious reasons.

Figure 4:
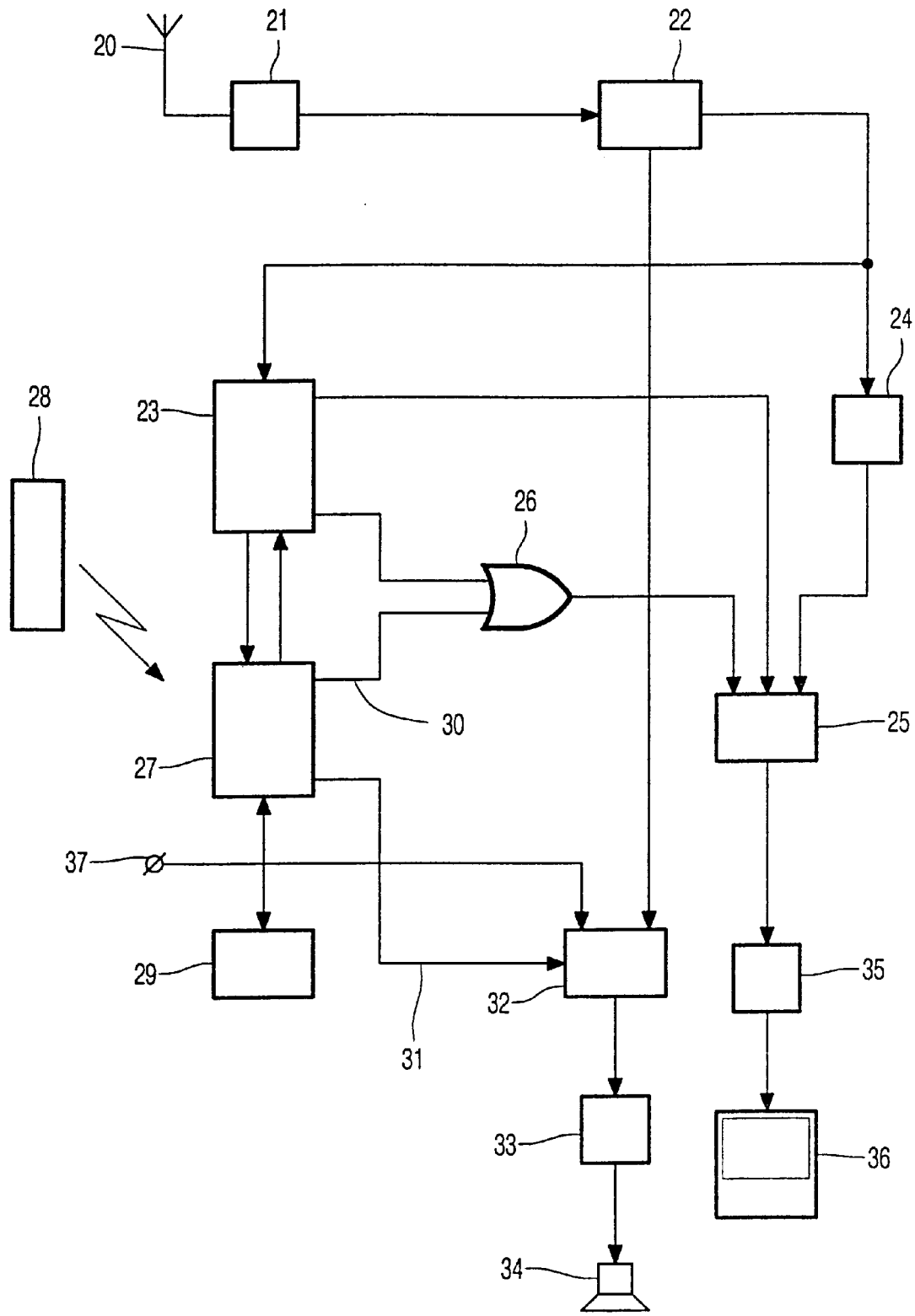
FIG. 4 shows, in block schematic form, a television receiver according to the invention.

FIG. 4 shows, in block schematic form, an embodiment of a television receiver according to the invention. As shown in FIG. 4, the television receiver comprises an aerial 20 which feeds a conventional tuner 21 and IF and demodulator block 22. A combined video and blanking signal is available at the output of the block 22 and is fed to a teletext decoder 23 and a color decoder 24. The output of the color decoder 24 is fed to a video selector 25 which also receives a display signal output from the teletext decoder 23 and a blanking signal via an OR-gate 26 from the teletext decoder 23.

A control processor 27 controls, in conventional fashion, the operation of the television receiver. It receives control instructions from a remote control unit 28 which the viewer uses to select a particular channel for display and selects other functions, such as, teletext display or on-screen menu displays. The processor 27 will receive, from the teletext decoder 23, the codes which are present in the packet 8/30 format 1, that is, the codes representing the content of sexual matter, violent matter, distressing matter or mature language. It will also store, within a non-volatile memory 29, codes which have been entered by the user using the remote control unit, which set the levels of sexual, violent, distressing or mature language content which are acceptable for display. The processor 27 will compare the received codes with the stored codes and, depending on the output of that comparison, will produce a signal on line 30 which is fed to the video selector 25 via the OR-gate 26 and which, in appropriate circumstances, will cause the video display to be blanked. It will also feed a signal via a line 31 to an audio selector 32 which will cause the audio output to be muted in appropriate circumstances.

The audio selector produces an output which is fed to the standard audio circuits represented by block 33 and to a loudspeaker 34, while the video selector 25 produces an output which is fed to standard video circuits 35 and to a display device 36. The audio selector 32 has a further input fed from a terminal 37 to which an alternative audio source may be connected. This may be, for example, a tone generator which replaces any offending words by a bleep, or it may be connected to an auxiliary channel, for example, an Audetel channel, to provide alternative words for the offensive words. The Audetel channel is a channel proposed for use for providing an audio assistance signal which provides a description of the scene to help the following of a program by persons unable to see the display screen clearly or at all, for example, blind or partially sighted persons. There will normally be some spare capacity on this channel which will enable an alternative word for possibly offensive words to be transmitted by the broadcaster, or to be encoded within any program source since Audetel will be idle while there is dialogue.

Thus far, the description of the television receiver shown in FIG. 4 is identical to that in our co-pending UK Patent Application No. 9619878.3 (PHB 34110). The present invention, however, provides a number of further facilities. The non-volatile memory 29 is capable of holding a plurality of sets of classification codes entered by the authorized person. Each set of classification codes has a time associated with it during which that set of classification codes is valid. The control processor 27 includes a timer which is able to monitor the time and to access the appropriate set of codes from the non-volatile memory.

The processor 27 may receive an indication of the time from the teletext decoder 23 which is derived from the teletext real-time clock transmitted by the program provider. The processor 27 may also include a clock generator to produce a real-time clock signal for use if a teletext real-time clock is not available either because it is not being transmitted or because it is invalid, for example, when receiving an input from a video recorder.

The processor 27 may be programmed to take various actions depending on entries made by the authorized user and on a determination of the program signal source. For example, the processor 27 will determine the source of the video signal, i.e., it controls the tuning circuits 21 and consequently it will know the signal source. It will also know if the signal source is a video recorder or other device, such as, a video disc player. In those cases, of course, a teletext real-time clock is either not available or not valid. The processor 27 may be programmed to enter a time correction to the teletext real-time clock if it determines that the program source is in a different time zone.

The processor 27 may be programmed so that if no classification codes are received, then, at certain times of the day, display from that source is inhibited.

FIG. 4 shows a television receiver but the invention could equally well be applied to a video recorder. In that case, the outputs of the audio and video selector circuits 32 and 25 would be fed to record heads on the video recorder. Thus only programs having the authorized codes would be recorded on the video recorder. An alternative arrangement for a video recorder would be to allow recording of the received television program regardless of the classification codes associated with it, but to record those codes on the tape so that on replay, the television receiver is able to react to the output from the video recorder in the same way that it would react to a broadcast program. In this way, a program can be recorded for viewing by a number of different persons, each of whom may have a different allowable classification level for particular content. Thus a whole program may be played back through one television receiver, but only a restricted version through another.

FIGS. 5A–5E illustrate an on-screen display sequence which enables a person to enter a single set of codes into a television receiver. On initial switch on, the on-screen display sets out a message which invites the user to enter a personal identification number. This is assuming that authorization is checked by means of a PIN. The PIN may be burned into a memory by the manufacturer who then informs the buyer of the number of the PIN so that the owner can initiate the selection of the classification. An alternative is to set the PIN to all zeros at the factory and for a routine to be entered into when the set is first switched on to change the PIN to any number that the user desires. Subsequently, when it is desired to change the classification, a key to request this is pressed on the remote control unit. This brings up the on-screen display message which invites the user to enter the PIN. This is shown as screen 1 in FIG. 5A.

The user then enters the PIN and, if this is checked correctly, the next on screen display is presented. This is numbered 2 in FIG. 5A. Initially, the television receiver will be set to receive all programs, but by using the television access control system, a choice can be made as to whether programs of a certain type are to be excluded. The on-screen display instructs the user which key to press to continue the process, in this instance the red key. The next screen presented, screen 3, invites the user to either press a green key to select the type of program that can be received or to press a red key if he wishes to leave the state unchanged.

Assuming that the green key has been pressed, the fourth screen is presented. This invites the user to decide whether programs with sexual content should be excluded and invites the user to press one button if such matter is to be excluded and a different button if the matter is not to be excluded. Assuming that the user would like to exclude at least some of the sexual content, then screen 5 is presented. This will invite the user to exclude either high levels, moderate or high levels or any level. In this particular example, the user chooses to exclude high levels only. In this particular instance, the user who has chosen to exclude high level only sexual content is then invited to indicate whether this content should be excluded only when the events occur or whether all programs which include high levels of sexual content should be completely excluded. Again the user is invited to press red in one instance and green in the other. That completes the programming for sexual content.

A similar process is followed for violent content and is shown on screens 7, 8 and 9. Screens 10, 11 and 12 show the process for enabling distressing content to be excluded. In this particular case, it is only excluded for the events in which the distressing content is present and not for the whole program. It is considered that distressing content is unlikely to be relevant to a whole program but only to events within a program. Such distressing content may be, for example, the showing of operations in medical programs, or the showing of the scenes of accidents or other disasters in news programs. These incidents will only be a small portion of such programs and the programs can be enjoyed readily with those incidents deleted.

A similar process is shown in screens 13 to 15 which enables the programming of the mature language content which is acceptable. Again, this only excludes the specific events rather than the program as a whole since the occurrence of possibly offensive words is likely to be only a small proportion of the program as a whole, especially if programs having excessive sexual or violent content are already excluded. Screens 16 and 17 illustrate the programming of the region of origin. It enables the user to exclude programs from certain regions, if desired. This may be desirable, for example, where a particular country is transmitting propaganda material which may not contain excessive sexual content or violent content or even distressing content or mature language, but the authorized person may wish to prevent reception of programs of such a nature. An alternative use for the region of origin codes is to modify the effective codes for sexual, violent, distressing content or mature language depending on the source of the program. Thus, from region A, it may be desired that the level of sexual content accepted is moderate level only because what is considered moderate in region A may be considered to be high in the region where the receiver is located. This code of changing may be programmed permanently into the receiver or may be settable by the user. Screen 18 is the final screen presented and confirms the choices which have been made by the user. This screen is similar in content to screen 2 which is presented when the entry to the access control system is obtained. Thus, once a setting has been made, this will be displayed on screen 2 at a subsequent access.

Figure 7:
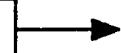
FIG. 7 illustrates further steps in a process for programming the television receiver to operate according to the method of the invention.

The present invention allows the setting of different classification codes for different times of day (or days of the week) and FIG. 7 illustrates additional screen display sequences to allow this facility.

Figure 5A:
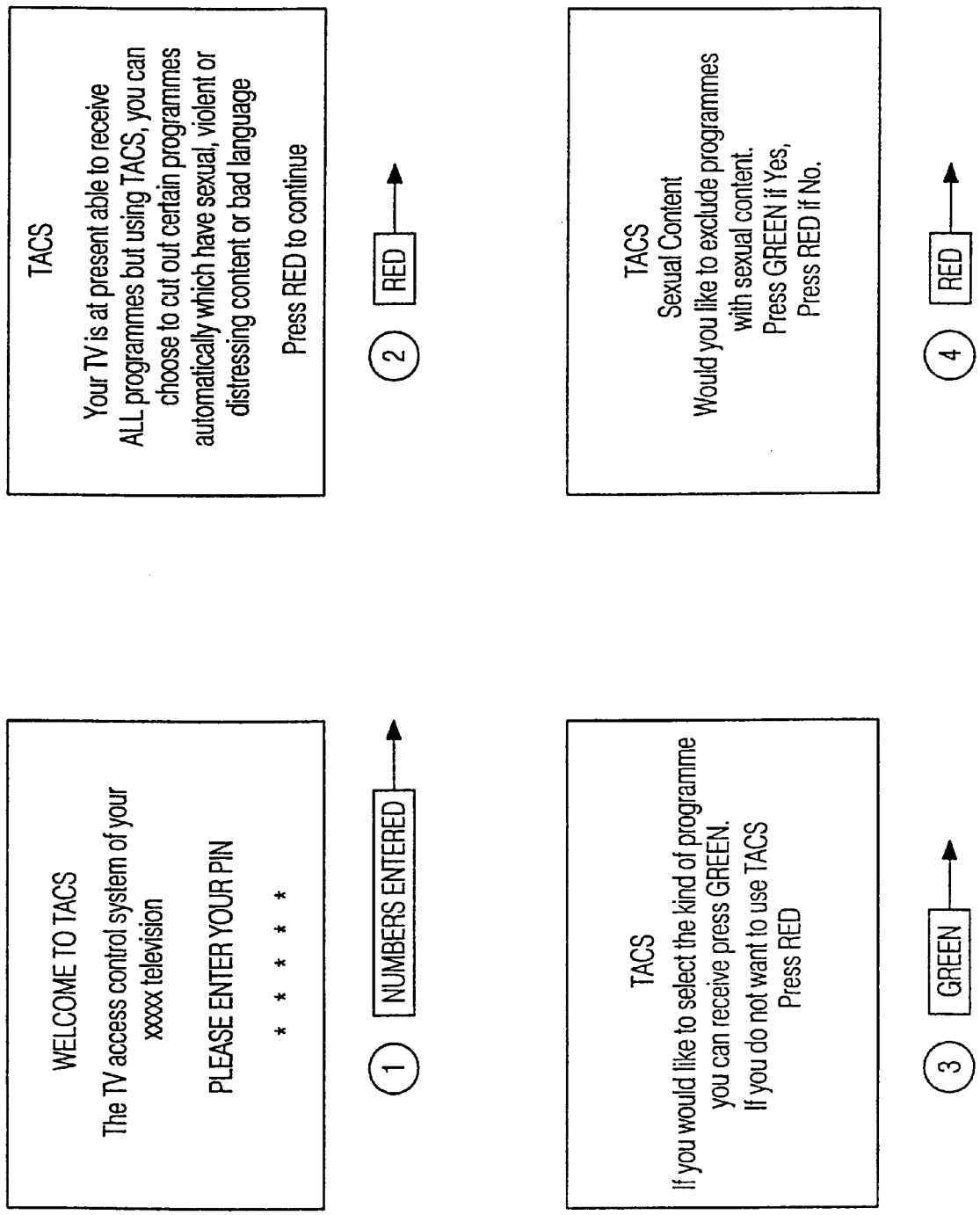
Figure 5B:
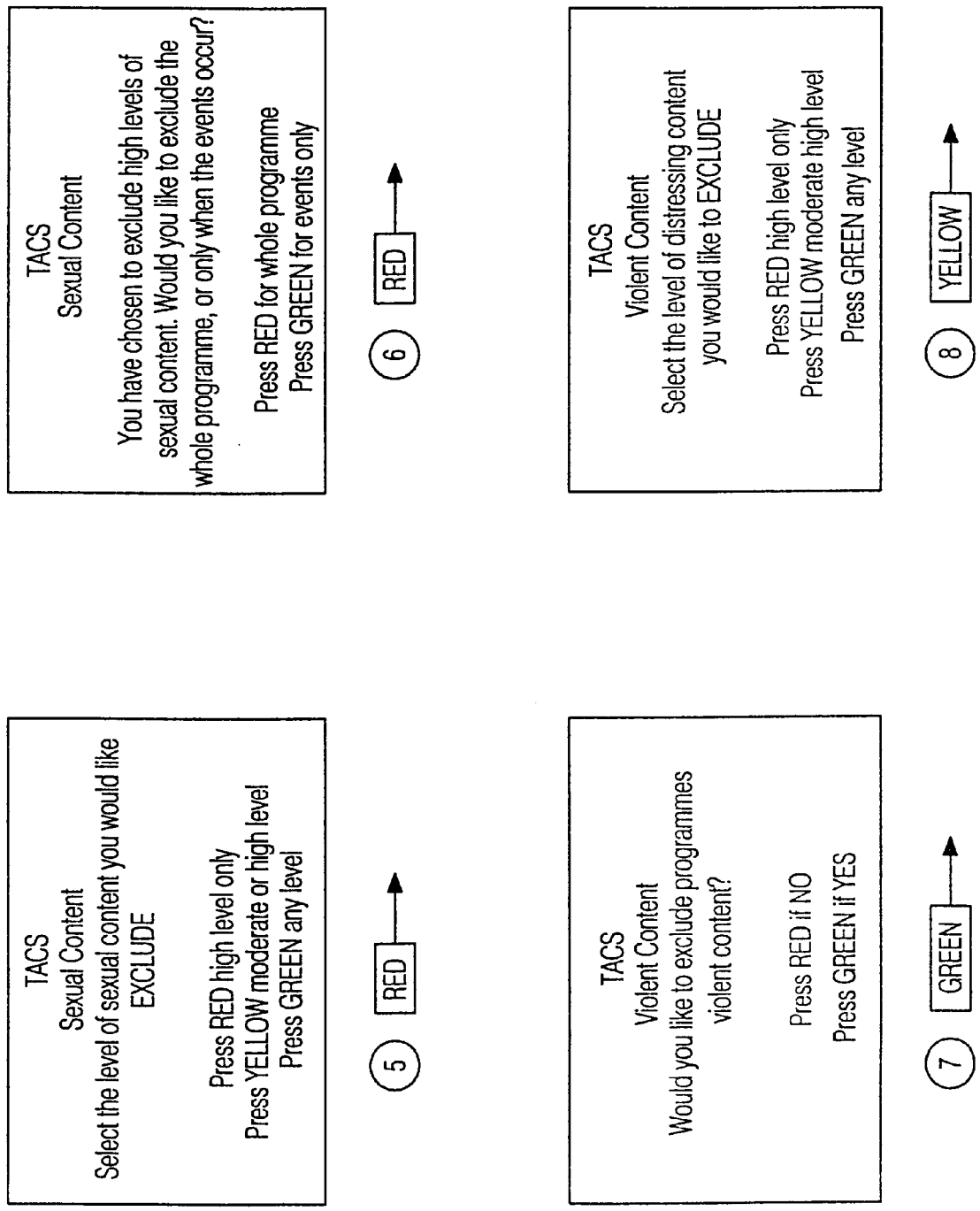
Figure 5C:
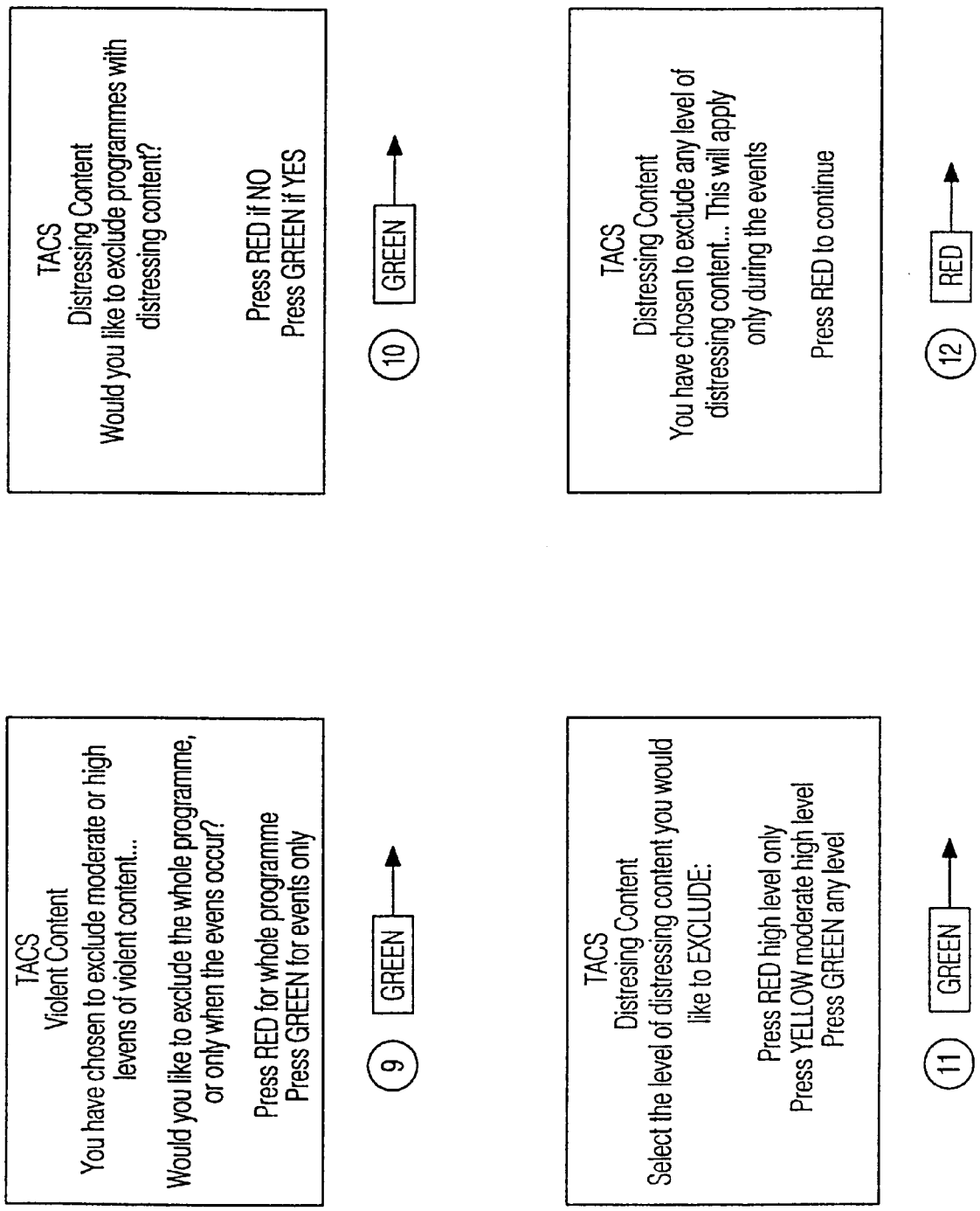
Figure 5E:
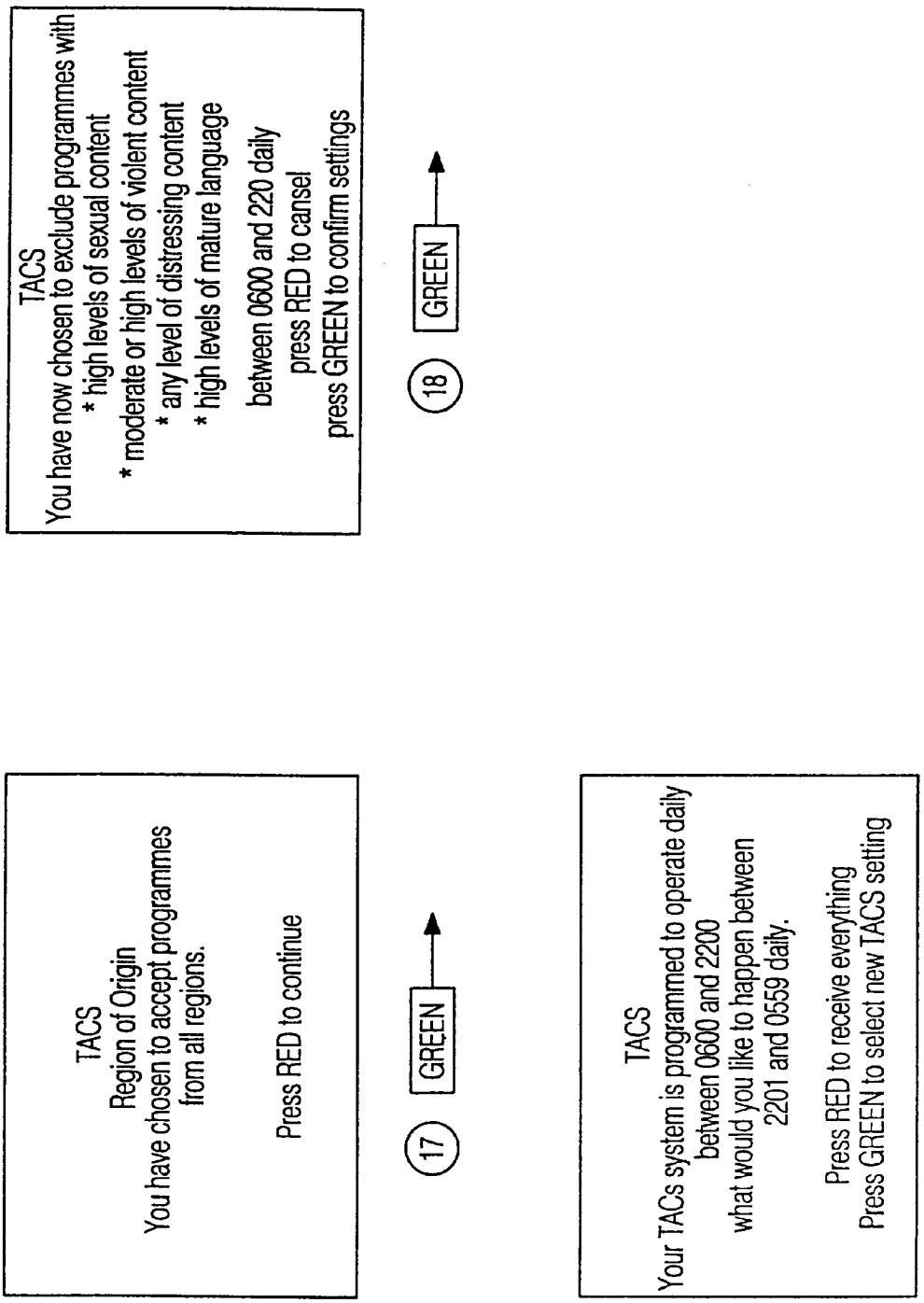

Screen 1 of FIG. 7 is entered after screen 3 of FIG. 5A and invites the user to select whether the code is to be valid all day or only for a selected time. If a selected time is chosen (green button), then screen 2 of FIG. 7 is displayed and the user is able to enter the start and finish times during which the codes are to be valid. When these times have been entered, screen 4 of FIG. 5A is displayed. The procedure then follows screens 4 to 18 of FIGS. 5A–5E. If the settings are confirmed, screen 19 is entered, and if RED is pressed, the setting process ends. If, however, GREEN is pressed, screen 2 of FIG. 7 is displayed and the process is repeated for different entered times. The number of different sets of codes which may be entered will depend on the capacity of the non-volatile memory used for storing them. Consequently, the process may be repeated more than twice depending on the memory capacity.

It will be apparent that these on-screen display messages are by way of example only and that the actual messages may be tailored for particular markets and will, of course, be in the language of the country in which the set is located. The control processor may, of course, store various on-screen displays in a number of different languages, the language choice being made by the user when accessing the on-screen displays, thus enabling a common control processor to serve sets sold in various different countries.

Figure 6:
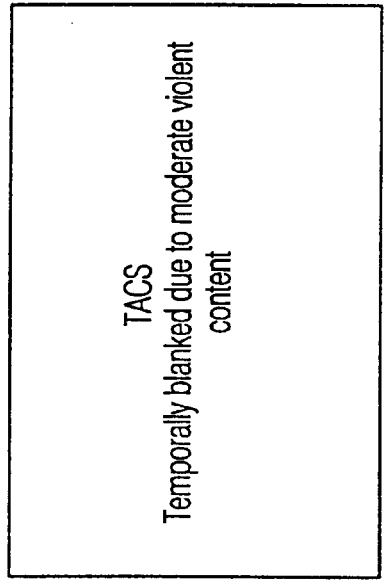
FIG. 6 illustrates possible on-screen display messages when the method is invoked.
Figure 6:
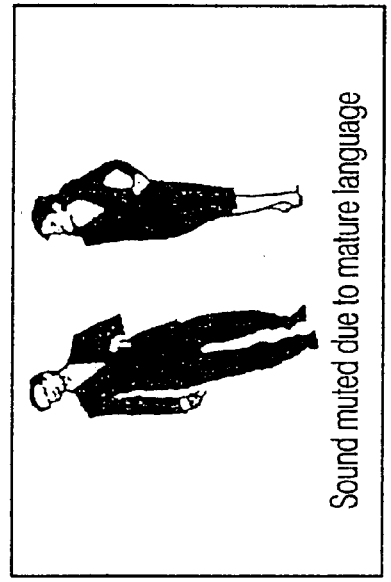
Figure 6:
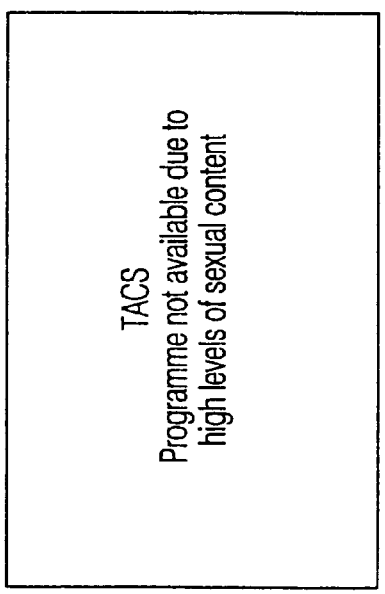
Figure 6:
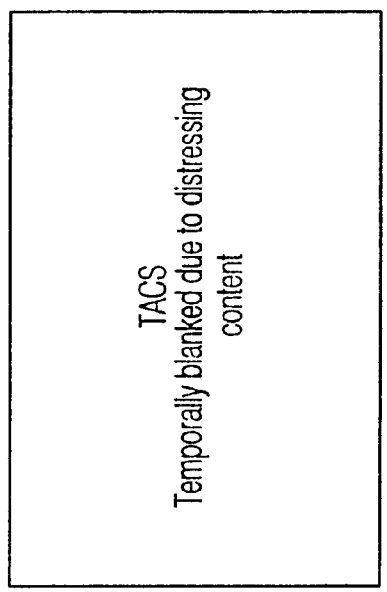

FIG. 6 shows examples of on-screen messages which are displayed when the access control system is in operation. Thus, the first screen shows that the program is not available and states that it is due to high levels of sexual content. This message will, of course, vary according to the reason for non-availability of that particular program and is defined by the coding associated with it. The second screen shows that the television is temporally blanked due to moderate violent content. Thus, during most of the program, the display will be available, but there is a temporary blanking of the visual display to prevent the viewer seeing violent content. The third screen shows, similarly, that the display is temporally blanked due to distressing content. The fourth screen shows the picture displayed with a message superimposed upon it stating that the sound has been muted because of mature language. Consequently, since the viewer is informed that the sound is temporally muted, he or she will not assume that there is a fault with the sound channel of the television receiver.

In the particular examples described, authorization of the user able to change the coding has been by means of a PIN. There are, however, various other ways in which a user can be authorized. One possibility would be a fingerprint detector so that it would be necessary for the user to place his or her hand or fingers on a detector pad which compares the fingerprint with one stored in the receiver. This would avoid any problems of forgetting the PIN or the PIN being compromised, for example, one of the children discovering the PIN and resetting the classification codes. A further possibility is to include a video camera on the receiver which will look at the face of the person wishing to change the code. The output of the video camera can be compared with a stored image within the receiver and if coincidence is found then updating of the classification code can be allowed. A means for recognizing facial characteristics is disclosed in European Patent Application EP-A-0551 941, corresponding to U.S. Pat. No. 5,561,718 (PHB 33765). The latter two methods may be used, for example, when a personal computer is fitted with a TV program receiver facility. The necessary processing circuits for the fingerprint or face recognition will then be within the personal computer circuits.

From reading the present disclosure, other modifications will be apparent to persons skilled in the art. Such modifications may involve other features which are already known in the design and use of television systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of disabling the sound and/or visual display of a television program in a television receiver, the method comprising the steps:
   (i) establishing the authority of the user to define the program or parts thereof which are to be disabled;
   (ii) entering into a memory within the television receiver, code words corresponding to a program classification that the user desires to suppress;
   (iii) entering into the memory the time(s) during which the code words entered in step (ii) are to apply;
   (iv) entering into the memory further code words corresponding to further program classifications that the user desires to suppress;
   (v) entering into the memory further time(s) during which the further code words are to apply;
   (vi) receiving television signals including code words representing the program classifications;
   (vii) comparing the received code words with the code words entered into the memory which apply at the time of reception; and
   (viii) disabling the sound and/or visual display in dependence on the result of the comparison.

2. The method as claimed in claim 1, wherein the method further comprises the steps:
   (ix) monitoring a teletext real-time clock to determine the time;
   (x) using the time determined in step (ix) to select the code words entered into the memory for comparison with the received code words.

3. The method as claimed in claim 1, wherein the method further comprises the steps:
   (xi) generating a real-time clock within the television receiver;
   (xii) monitoring the real-time clock to determine the time; and
   (xiii) using the time determined in step (xii) to select the code words entered into the memory for comparison with the received code words.

4. The method as claimed in claim 2, wherein the method further comprises the steps:
   (xiv) monitoring the source of the received television signal; and
   (xv) if the received television signal from the source is time-shifted from the original transmission of the television signal so that a teletext real-time clock accompanying the original transmission is not valid, setting the code words to be compared to the received code words to a lowest level classification.

5. A television receiver comprising:

means for receiving a television signal containing a television program;

means for generating audible sound signals corresponding to sound signals contained in the received television signal; and means for displaying images corresponding to video signals contained in the received television signal, wherein said received television signals includes classification codes for the contained television program, and said television receiver further comprises:

means for enabling an authorized person to disable the sound and/or visual display of a contained television program according to the classification codes received with the television signal;

means for establishing the authorization of the authorized person;

non-volatile memory means for storing a plurality of sets classification codes entered by the authorized person, each set of classification codes being valid at times entered by the authorized person;

means for receiving and detecting classification codes included with the received television signal;

means for monitoring the time;

means for selecting one of said sets of classification codes in dependence on the monitored time;

means for comparing the selected one of the sets of classification codes with the received classification codes; and means for disabling the sound and/or visual display in dependence on the results of the comparison.

6. The television receiver as claimed in claim 5, wherein the means for monitoring the time comprises:

means for decoding a teletext signal multiplexed with the received television signal; and means for monitoring a real-time clock signal forming part of the teletext signal.

7. The television receiver as claimed in claim 5, wherein the means for monitoring the time comprises:

means for generating a real-time clock; and means for using an output of the real-time clock generating means to select the appropriate one of the sets of classification codes.

8. The television receiver as claimed in claim 6, wherein the television receiver further comprises:

means for monitoring the source of the received television signal; and means for establishing whether the teletext real-time clock signal is a valid representation of the actual time.

9. The television receiver as claimed in claim 8, wherein the television receiver further comprises:

means for modifying the time indicated by the teletext real-time clock if said establishing means determines that the received television signal origin ated from a source located in a different time zone from that in which the television receiver is located.

10. The television receiver as claimed in claim 8, wherein the television receiver further comprises means for inhibiting the selection of a set of classification codes by the selecting means if the source monitoring means determines that the received television signal is being replayed by a recording device.

11. A television receiver as claimed in claim 10, wherein the selecting means selects a set of codes representing the lowest classification level.

12. The method as claimed in claim 2, wherein the method further comprises the steps:

(xiv) monitoring the source of the received television signal; and (xv) if the received television signal from the source is time-shifted from the original transmission of the television signal so that a teletext real-time clock accompanying the original transmission is not valid, disabling the sound or visual display of the television receiver.

13. The method as claimed in claim 2, wherein the method further comprises the steps:

(xiv) monitoring the source of the received television signal; and (xv) if the received television signal from the source is time-shifted from the original transmission of the television signal so that a teletext real-time clock accompanying the original transmission is not valid, performing the following steps:

(xvi) generating a real-time clock within the television receiver;

(xvii) monitoring the generated real-time clock to determine the time; and (xviii) using the time determined in step (xvii) to select the code words entered into the memory for comparison with the received code words.

* * * * *